Aug. 2, 1955
W. H. ZINN
2,714,668
RADIATION RESPONSIVE DEVICE
Filed Feb. 6, 1945
2 Sheets-Sheet 1
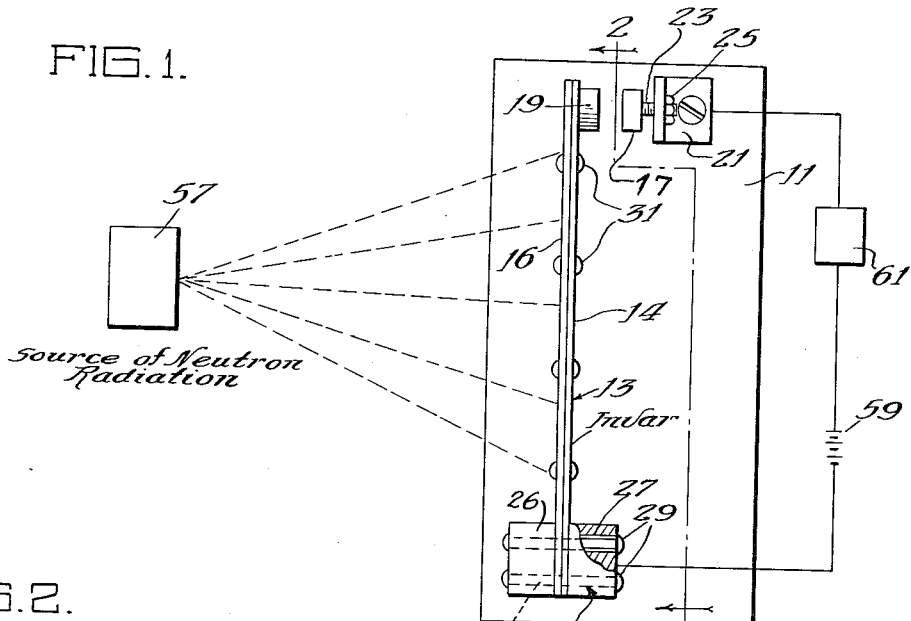
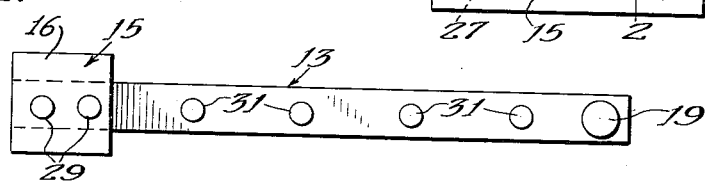
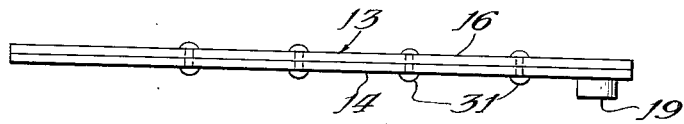
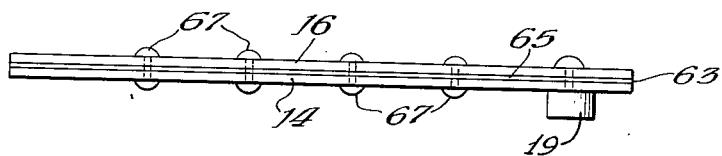
Witnesses:
Herbert E. Metcalf
Paul A. Glatster
Inventor:
Walter H. Zinn
By: Robert A. Savada
Attorney Aug. 2, 1955

W. H. ZINN 2,714,668

RADIATION RESPONSIVE DEVICE

Filed Feb. 6, 1945

Witnesses:
Herbert E. Metcalf
Paul J. Glaister

Inventors:
Walter H. Zinn
By Robert A. Zavender
Attorney.

United States Patent Office 2,714,668
Patented Aug. 2, 1955

2,714,668

RADIATION RESPONSIVE DEVICE

Walter H. Zinn, Chicago, Ill., assignor to the United States of America as represented by the United States Atomic Energy Commission Application February 6, 1945, Serial No. 576,412

13 Claims. (Cl. 250—83)

The present invention relates to neutron responsive devices, and particularly to devices of the type adapted for use in connection with the control and protection of neutronic reactor systems.

The term neutronic reactor system is used herein to define a complete system designed for initiating and carrying out chain nuclear reactions. Such systems are completely described in a copending application of Enrico Fermi et al. Serial No. 568,904, filed December 19, 1944, and include a neutronic reactor wherein neutrons are developed by fission of fissionable materials, such as the $U^{235}$ content of natural uranium, and reserved for sustaining the reaction, control apparatus for initiating and controlling the progress of the reaction, and shielding means for protecting the operating personnel from the radiations developed during the operation of the system.

The power output of a neutronic reactor system at any particular instant is, in general, proportional to the neutron density existing at that particular time within the neutronic reactor, the neutron density thus provides a convenient basis for controlling the operation of such systems and for effecting the operation of alarm or safety devices in the event that the output of the reactor reaches certain prescribed maximum values. It is with this type of device that the present invention is primarily concerned.

The principal object of the invention is to provide a simple and yet reliable apparatus operable in response to neutron radiation of predetermined density to effect the operation of neutronic reactor control or safety devices, or the like. An ancillary object of the invention is to provide a device in accordance with the principal object which automatically resets itself in the shortest possible interval of time after each operation thereof.

As will hereinafter appear, these objects are accomplished by the provision of a neutron radiation responsive element which is adapted to move or flex in response to neutron density changes, and which includes, as an integral part of its structure, means which become heated when subjected to neutron irradiation, the amount of heat generated being dependent on the neutron density to which the said means is subjected. Since the device is dependent upon heating to effect its operation, thermal compensating means are provided in certain instances to render the operation of the device independent of changes in the ambient temperature.

The various novel structural features and arrangements contributing to the successful operation of the apparatus of the invention, and a more complete exposition of its principles and mode of operation will be found in the following description and the accompanying drawings of certain preferred embodiments thereof.

In the drawings:

Fig. 1 is a plan view of a neutron responsive device in accordance with the present invention, including a schematic representation of certain associated equipment;

Fig. 2 is a detailed view of the radiation responsive element and a portion of the support means therefore of the structure illustrated in Fig. 1, the view showing the side indicated by the arrows 2—2 in Fig. 1;

Fig. 3 is a plan view of the radiation responsive element shown in Fig. 2 with a portion removed;

Fig. 4 is a view corresponding to Fig. 3 of a modified form of the invention;

Figure 5:
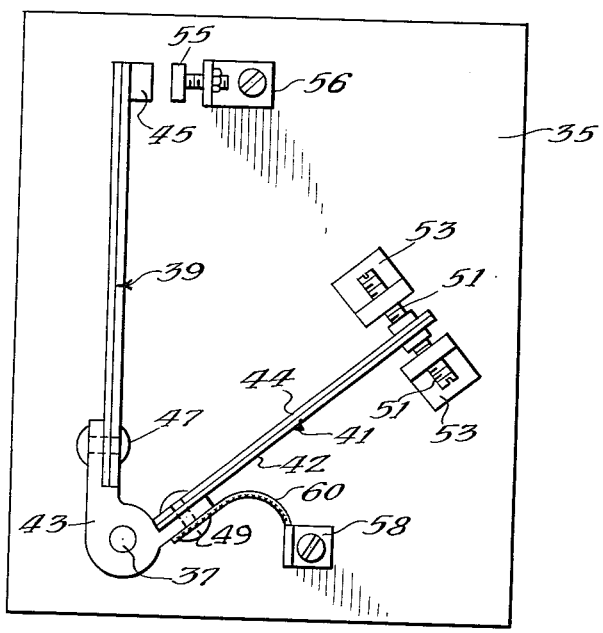
Fig. 5 is a plan view of a neutron responsive device constructed in accordance with the invention which includes thermal compensating means.

The radiation responsive device illustrated in Fig. 1 includes a base 11 which may comprise a block of insulating material, preferably of low neutron capture capabilities, an elongated, rectangularly shaped, bimetallic strip 13 which constitutes the radiation responsive element of the device, a support 15 for one end of the bimetallic strip 13, an adjustable stationary contact 17, and a movable contact 19 which is rigidly attached to the unsupported end of the bimetallic strip 13. The adjustable contact 17 may conveniently be supported upon the base 11 by means of an angle bracket 21, and adjustment of the contact 17 may be accomplished by the use of a threaded shank 23 which engages a suitably threaded hole in the contact supporting bracket 21. A locking nut 25 retains the contact in adjusted position.

The support 15 for the fixed end of the radiation responsive member 13 is preferably of massive construction in order that it may have a relatively large thermal capacity. In the structure shown in Fig. 1, this support comprises a pair of rectangularly shaped metallic blocks 26 supported on the base 11, and the blocks 26 are provided with aligned openings 27 for receiving rivets 29 which serve to mechanically interconnect the support blocks 26 and to fasten together the radiation responsive member 13. The support 15 should preferably be constructed of metal having low neutron capture capabilities, and it is desirable that the material shall have good heat conducting properties. Aluminum has been found particularly satisfactory.

The radiation responsive element 13 is of laminated construction, and comprises two relatively thin, elongated, rectangular strips of metal 14 and 16 which are fastened together by rivets 31, or by other means, to provide a composite member. The two strips 14 and 16 should be of dissimilar materials having substantially differing coefficients of thermal expansion in order that the composite strip will flex when heated. In order that the flexure of the strip may be responsive to neutron irradiation, it is necessary that one of the component parts of the strip shall be of a material having higher neutron capture capabilities than the other strip, or at least that one of the two strips will heat at a different rate than the other strip as a result of neutron capture. While various metals, and possibly other materials, may be used for the component parts of the radiation responsive member 13, particularly satisfactory results have been obtained by the use of a strip 14 of Invar, approximately 5 inches long, ⅜ inch wide, and about 0.18 inch thick, in combination with a strip 16 of uranium, of similar length and width, about .034 inch thick.

Uranium has been referred to above as including the fissionable isotope $U^{235}$. When such fissionable material is subjected to neutron irradiation by thermal neutrons such as are present in or escape from a neutronic reactor, the $U^{235}$ uranium isotope fissions with the liberation of additional neutrons, fission fragments comprising newly formed elements, and beta and gamma radiation. The fission fragments, beta and gamma rays are liberated with great kinetic energy and absorbed primarily by the uranium causing considerable heat to be released resulting in self-heating of the uranium. Such heating is very rapid when the uranium is subjected to high neutron densities. As a consequence, it is preferred to provide the strip 16 of highly fissionable material such as uranium, as indicated above, and the strip 14 of less fissionable, or non-fissionable material, which is subject to heating by capture of neutrons to a lower degree. The capture of neutrons, particularly fast neutrons, produces some heating of the metallic strips 14 and 16 and consequently the strip 14 is preferably constructed of a material, not only non-fissionable, but of low neutron capture capabilities, also as indicated above.

In addition to natural uranium for the strip 16 this strip may also be made of materials incorporating other fissionable isotopes, such as $U^{233}$ or $U^{239}$, or materials having high neutron capture properties, such as cadmium, boron, gadolinium and samarium or alloys of these metals with other metals, it being desired that the selected metal or alloy have a coefficient of expansion higher than the metal of strip 14. Thus, while it is not necessary that the strip 16 have a higher coefficient of expansion than the strip 14, particularly when the two strips are heat insulated from one another, as later described in connection with Fig. 4, because the strip 16, when subjected to neutron bombardment, is raised to a higher temperature than the strip 14; the higher the coefficient of expansion and the greater its neutron capture properties, either with or without the production of fission, the greater will be the sensitivity of the device to changes in neutron density.

A device constructed as shown in Fig. 1 will not compensate for changes in ambient temperature and will operate to close the contacts 17 and 19 when the summation of the flexure produced by the heating resulting from neutron capture and the flexure produced by heating from the ambient medium reaches the operating point of the device. Because of this inherent lack of compensation in single element devices, it may be desirable, in certain instances, to provide temperature compensating means, and such a structure is illustrated in Fig. 5.

The apparatus of Fig. 5 includes a base of 35 of insulating material preferably having low neutron capture capabilities. A hinge pin 37 is supported upon the base, and this pin 37 supports the movable portions of the apparatus which include a neutron responsive element 39, a thermally responsive element 41, and a bell crank support 43 for mechanically interconnecting the elements 39 and 41. The neutron responsive element 39 may be similar to the element 13 of the device previously described, and includes two, elongated, flat strips of dissimilar metals integrally joined together in such manner that heating of the interconnected strips will produce flexure thereof. At least one of the metals has high neutron capture capabilities and is preferably fissionable, whereby heating and flexure of the strip 39 will result when it is subjected to neutron irradiation. A contact 45 is carried at the free end of the element 39, and the other end is rigidly attached, as by the rivet 47, to one arm of the bell-crank 43.

The thermal compensating element 41, in the particular structure illustrated, is also of bimetallic construction comprising strips 42 and 44, and it is important that neither of the constituent parts 42 and 44 thereof shall have high neutron capture capabilities or be fissionable, because it is desired that this element shall be responsive to temperature changes alone and shall not be heated upon exposure to neutron irradiation. The element 41 may comprise aluminum for the strip 42 and beryllium for the strip 44, neither of these materials being fissionable or highly absorbent to neutrons. In fact, these strips may be of non-metallic nature provided the ambient temperature to which the device is subjected is not excessive.

One end of the temperature compensating element 41 is affixed at the other arm of the bell-crank 43 by a rivet 49, or equivalent means, and the other end is adapted to be held between a pair of adjustable clamping screws 51 which are supported upon brackets 53 affixed to the base 35. The adjustable clamping screws 51, together with the adjustable screw support provided for the fixed contact 55, permit convenient adjustment of the operating characteristics of the device. Electrical connections to the contacts 45 and 55 are provided by the supporting bracket 56 for the fixed contact 55 and a terminal 58 connected to the bell-crank 43 by a flexible connector 60.

The distance from the pivot point of the interconnected neutron and thermally responsive elements 39 and 41 to the point where the clamping screws 51 engages the thermal element 41 should be so correlated, with reference to the thermal flexure characteristics of the neutron responsive element 39, so that the separation of the contacts 45 and 55 will remain constant or substantially constant despite changes in the ambient temperature. When this condition prevails, it will be apparent that only the flexure of the neutron responsive element 39 in response to heating produced by neutron irradiation will be effective to close the contacts 45 and 55, and the device will, therefore, be accurately responsive to neutron irradiation density irrespective of changes in ambient temperature.

During use of devices of this type, it is intended that they shall be located within or adjacent to a neutronic reactor, or other source of neutron radiation. Such a relative arrangement of the parts is shown schematically in Fig. 1, a source of neutron radiation being indicated at 57. While any suitable means may be used for indicating positional changes of the bimetallic, neutron responsive element 13 or 39, the device finds its greatest utility as a safety device adapted to operate when the neutron density of the associated source reaches a predetermined maximum value. When so used, the device need operate merely to open and close contacts, and this is the arrangement illustrated in the two embodiments of the invention shown in Figs. 1 and 5 in the drawings. When employed as a switch, an electrical potential is applied across the fixed and movable contacts 17 and 19 from a battery, as indicated at 59, or from other suitable sources. The circuit will also include an indicator, or alarm device, or a relay, indicated generally at 61, which may be operable to initiate or control the operation of safety apparatus, or other means, as may be desired.

In certain instances, it has been found desirable to insulate the two portions of the bimetallic element 13 by means such as a thin sheet of mica, and such an arrangement is shown in Fig. 4. This construction employs strips of Invar 14 and uranium 16 similar to the members of the previously described embodiments, and a thin strip 65 of mica is sandwiched therebetween and is held in place by the rivets 67 which fasten together the metal strips. This construction gives a particularly rapid response to sudden changes in neutron intensity and is of particular advantage where high sensitivity to rapid changes in neutron density is desired.

Figure 6:
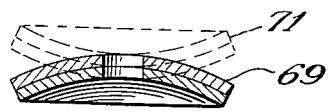
Fig. 6 is a plan view of another modified radiation responsive element constructed in accordance with the invention.
Figure 7:
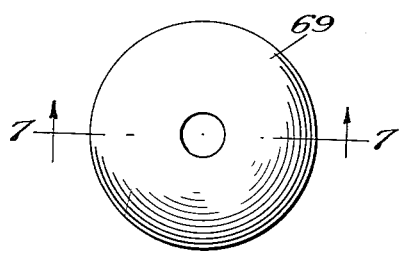
Fig. 7 is a sectional view taken on the line 7—7 of Fig. 6.

It is also sometimes desirable that the neutron responsive element shall be snap acting. This may be accomplished by the use of a cup-shaped bimetallic disc, as illustrated at 69 in Fig. 6. The disc 69 is cut from bimetallic sheet material and is permanently stressed into cup shape. The thermal expansion characteristics of the component layers of the metal are such that upon heating to a predetermined temperature the device will move from the position shown in full in Fig. 7 to the position indicated by the dotted lines 71 of that figure. This movement of the disc, or cup-shaped member 69, takes place with a snap action. Electrical contacts or mechanical position indicating means may be mounted so as to be engaged when the member 69 moves from one position to the other. At least one of the component parts of the device should be made of metal having high neutron capture capabilities in order that heating and flexure of the disc will result upon neutron irradiation thereof.

The use of high thermal capacity support means, such as are illustrated at 15, in Fig. 1, for the strip type radiation responsive element is of particular value in restoring the device to an operative condition in the minimum possible interval of time following operating thereof. Since the heating of the neutron responsive element upon neutron irradiation is due to fission and/or neutron capture depending upon the material of strip 16, and not to heat absorption from the ambient medium, the support members are at a considerably lower temperature than the radiation responsive element at the time of operation. This means that the support members are capable of absorbing heat from the radiation responsive element, and are in a position to effect rapid cooling of the radiation responsive element immediately upon the operation thereof provided, of course, that the neutron irradiation then ceases, which will be the case in the normal mode of operation of the device.

The features of the invention which are believed to be new are expressly set forth in the appended claims.

What is claimed is:

1. A radiation responsive device of the class described comprising a composite member having portions of dissimilar materials which have differing coefficients of thermal expansion and at least one of which has high neutron capture capabilities, said portions being joined together in such manner that the heating resulting from neutron irradiation of said member will effect flexure thereof, and a thermal insulation member interposed between said portions.

2. A radiation responsive device of the class described comprising a composite, laminated member made from a plurality of flat sheets of dissimilar materials which have differing coefficients of thermal expansion and at least one of which has greater neutron capture capabilities than another, said laminations being joined together in such manner that the heating resulting from neutron irradiation of said member will effect flexure thereof, and a thermal insulation member interposed between said portions.

3. A radiation responsive device of the class described comprising a member made from bimetallic sheet metal, the component parts of said bimetallic member having differing coefficients of thermal expansion and at least one of said parts being of a fissionable material, said parts being joined together in such manner that the heating resulting from neutron irradiation of said member will effect flexure thereof.

4. A radiation responsive device of the class described comprising a composite member having portions of dissimilar materials which have differing coefficients of thermal expansion and at least one of which has high neutron capture capabilities, said portions being thermally insulated from each other and being joined together in such manner that the heating resulting from neutron irradiation of said member will effect flexure thereof, support means for said member, and means for indicating positional changes of said member produced by flexure thereof.

5. A radiation responsive device of the class described comprising a composite, laminated member made from a plurality of flat sheets of dissimilar materials which have differing coefficients of thermal expansion and at least one of which has high neutron capture capabilities and a flat sheet of thermally insulating material between said first sheets, said laminations being joined together in such manner that the heating resulting from neutron irradiation of said member will effect flexure thereof, means for supporting said member at one end thereof, and means for indicating positional changes of said member produced by flexure thereof.

6. A radiation responsive device of the class described comprising a composite member having portions of dissimilar materials which have differing coefficients of thermal expansion and at least one of which has high neutron capture capabilities, said portions being thermally insulated from each other and being joined together in such manner that the heating resulting from neutron irradiation of such member will effect flexure thereof, and thermal compensating means actuable to render the operation of said device substantially independent of changes in the ambient temperature.

7. A radiation responsive device of the class described comprising a composite, laminated member made from a plurality of flat sheets of dissimilar metals which have differing coefficients of thermal expansion and at least one of which has high neutron capture capabilities, said laminations being thermally insulated from each other and being joined in such manner that the heating resulting from neutron irradiation of said member will effect flexure thereof, and thermal compensating means comprising temperature responsive means made of material having low neutron capture capabilities operable to render the operation of said device substantially independent of changes in the ambient temperature.

8. A neutron responsive means for use in connection with a device of the class described comprising a composite member which has a portion of uranium metal and a portion of Invar, said portions being joined together in such manner that said member will flex when it is heated.

9. A neutron responsive member for use in connection with a device of the class described comprising a strip of uranium metal and a strip of Invar fastened together in such manner that said member will flex when heated.

10. A neutron responsive member for use in connection with a device of the class described comprising a strip of uranium metal and strip of Invar fastened together, with a sheet of mica sandwiched therebetween, in such manner that said member will flex when heated.

11. A neutron responsive device of the class described comprising a composite member having portions of dissimilar materials which have differing coefficients of thermal expansion and at least one of which has high neutron capture possibilities, said portions being joined together in such manner that the heating resulting from neutron irradiation of said member will effect flexure thereof, and support means for said member which inludes means of substantially greater thermal capacity than said composite member connected in heat conductive relation therewith, said last mentioned means being constructed of a material having low neutron capture capabilities.

12. A neutron responsive device of the class described comprising a composite, laminated member made from a plurality of flat sheets of dissimilar metals which have differing coefficients of thermal expansion and at least one of which has high neutron capture capabilities, said laminations being joined together in such manner that the heating resulting from neutron irradiation of said member will effect flexure thereof, support means for said member which includes means of substantially greater thermal capacity than said composite member connected in heat conductive relation therewith, said last mentioned means being constructed of a material having low neutron capture capabilities, and means for indicating positional changes of said composite member produced by flexure thereof.

13. A radiation responsive device of the class described comprising a composite, laminated member including a pair of sheets of dissimilar materials having different neutron capture characteristics so as to be heated differently as a result of neutron capture, said sheets being thermally insulated from each other and joined together to form in effect a bimetallic strip.

(References on following page)

References Cited in the file of this patent

UNITED STATES PATENTS

| | | |
|---|---|---|
| 516,043 | Barney | Mar. 6, 1894 |
| 1,287,188 | Beck | Dec. 10, 1918 |
| 2,188,115 | Kallmann et al. | Jan. 23, 1940 |
| 2,206,634 | Fermi | July 2, 1940 |
| 2,220,509 | Brons | Nov. 5, 1940 |
| 2,348,810 | Hare | May 16, 1944 |